Oct. 30, 1945.   J. B. ARMITAGE ET AL   2,387,820
MACHINE TOOL
Filed April 30, 1942   10 Sheets-Sheet 1

INVENTORS:
JOSEPH B·ARMITAGE·ORRIN J·BARKER·
KURT A·RIEDEL & FRANCIS D·BOEHMER·
BY:
W. D. O'Connor
ATTORNEY.

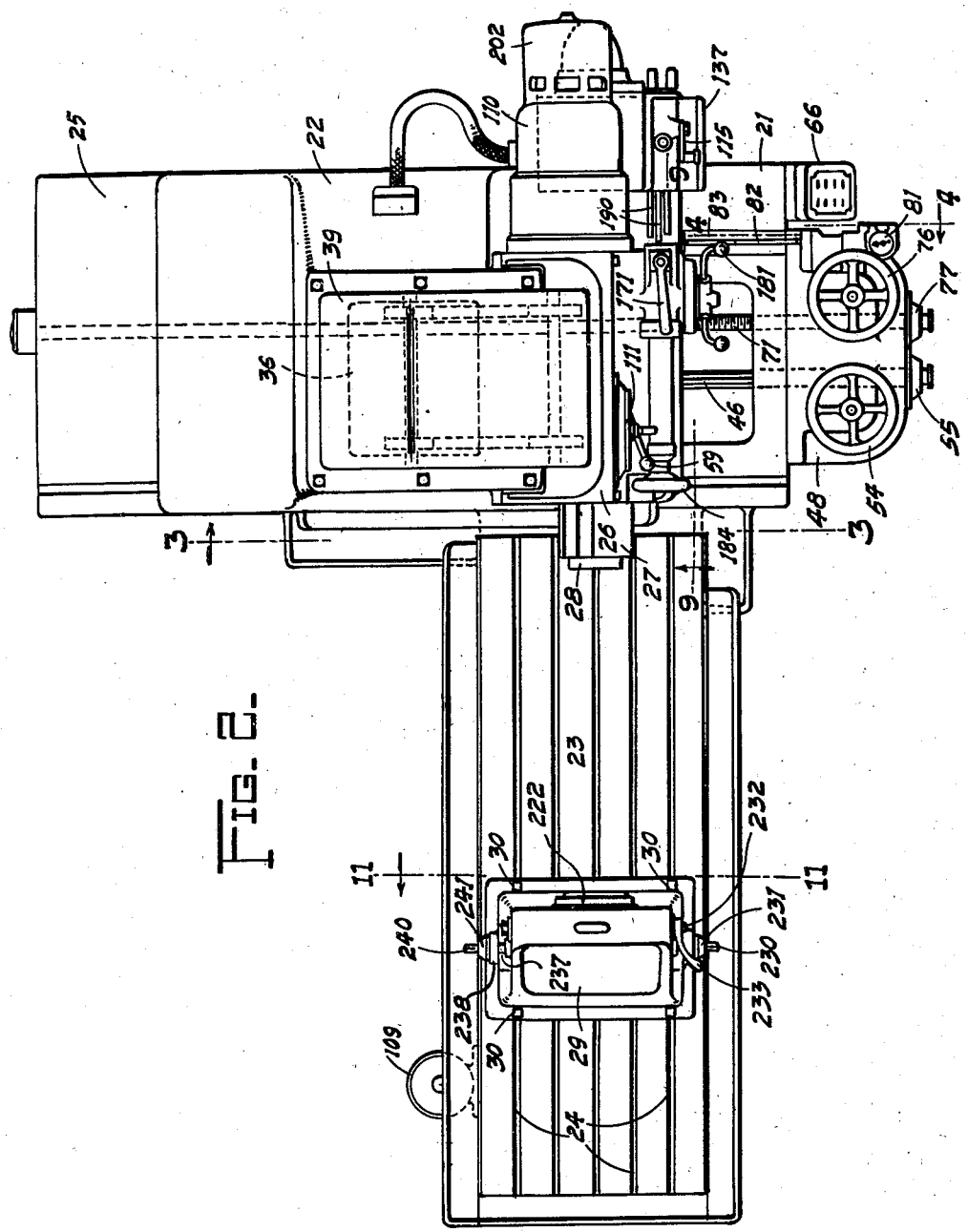

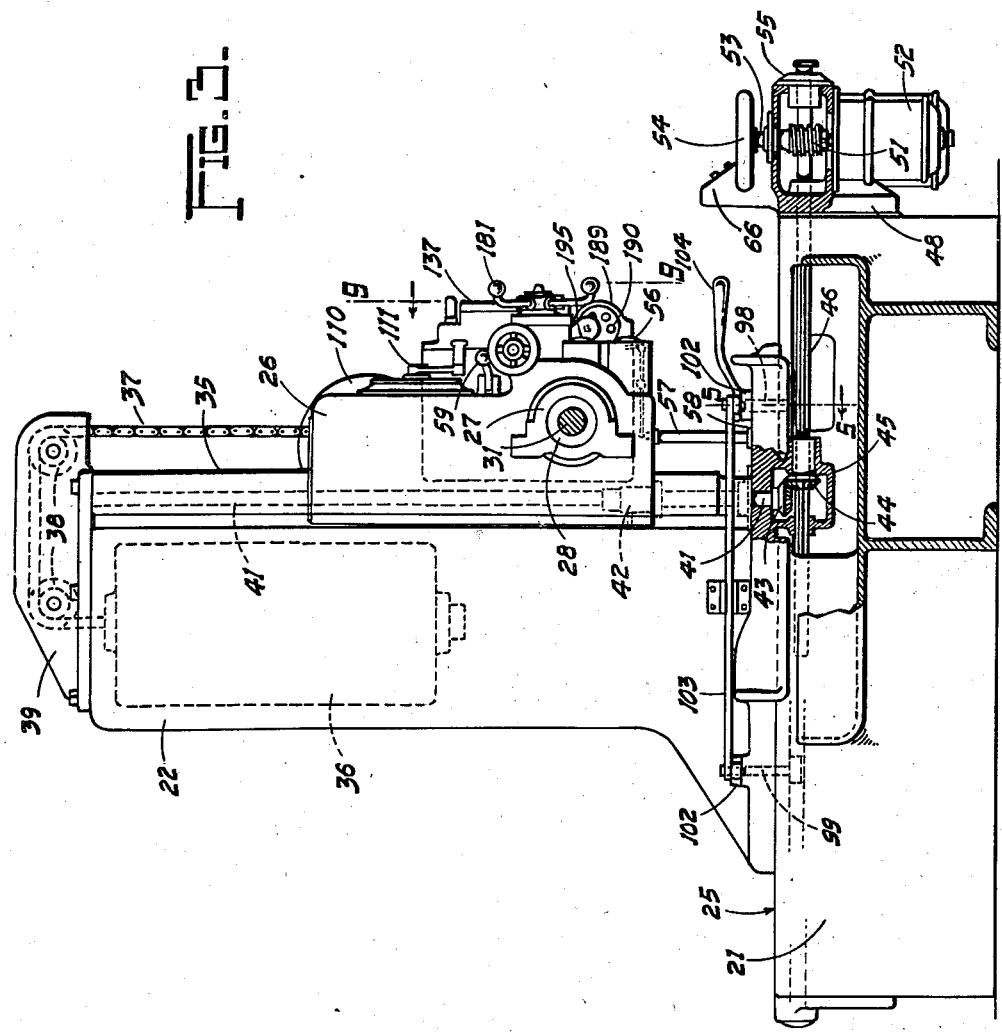

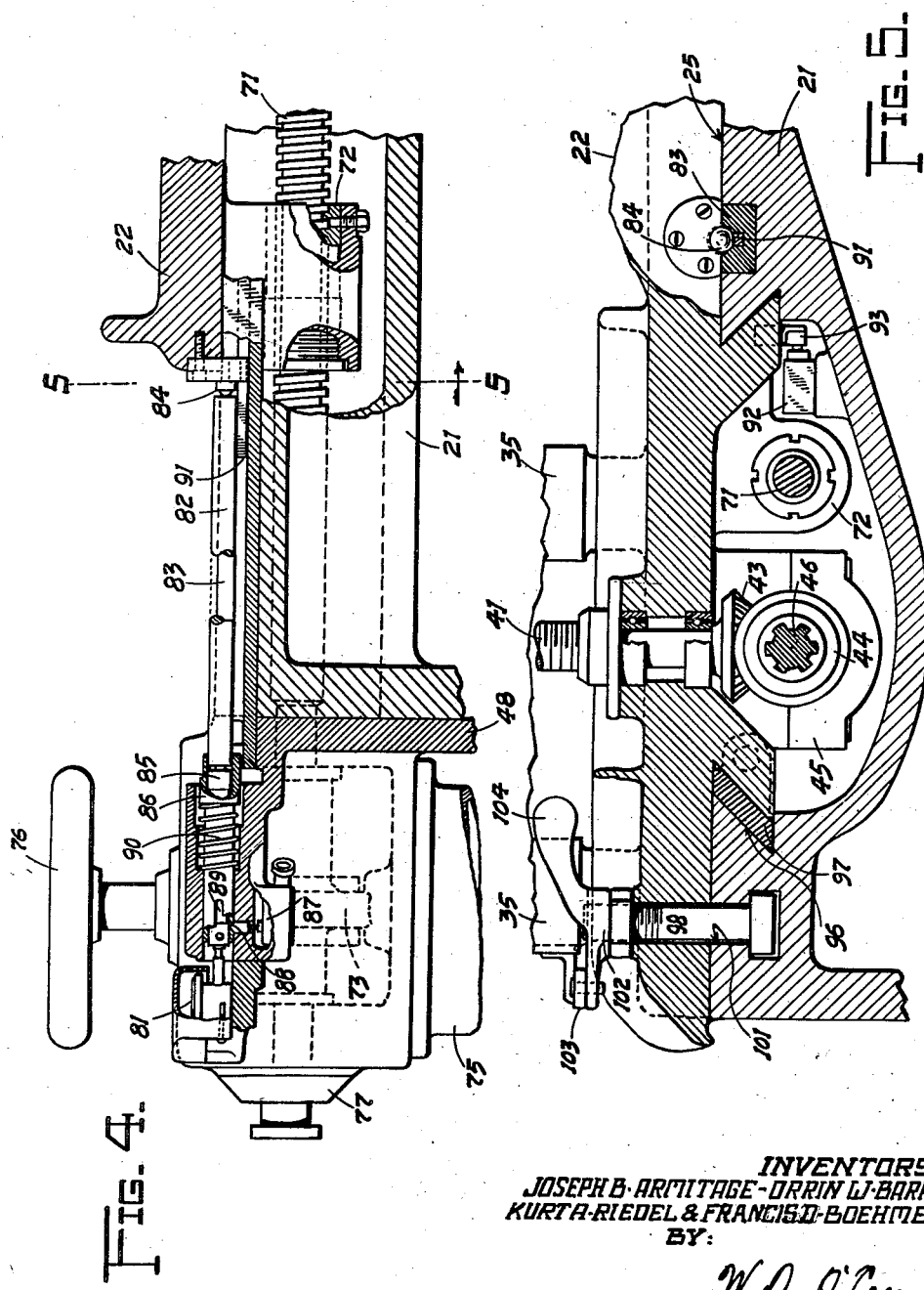

INVENTORS:
JOSEPH B. ARMITAGE-ORRIN W. BARKER-
KURT A. RIEDEL & FRANCIS D. BOEHMER.
BY:
W. D. O'Connor
ATTORNEY.

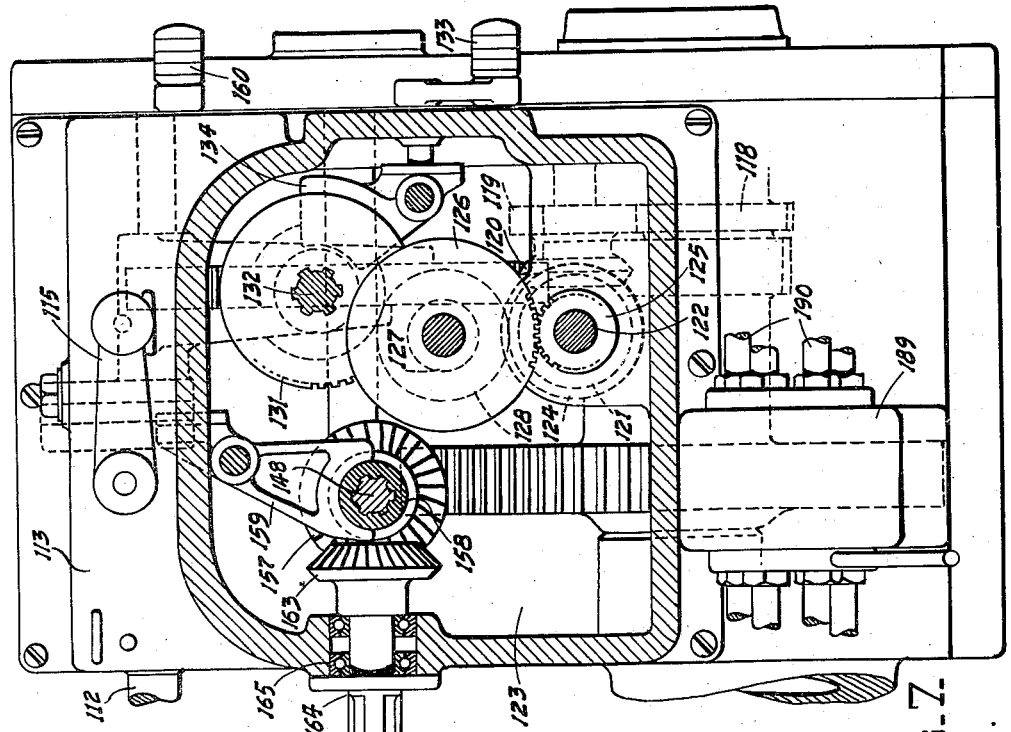
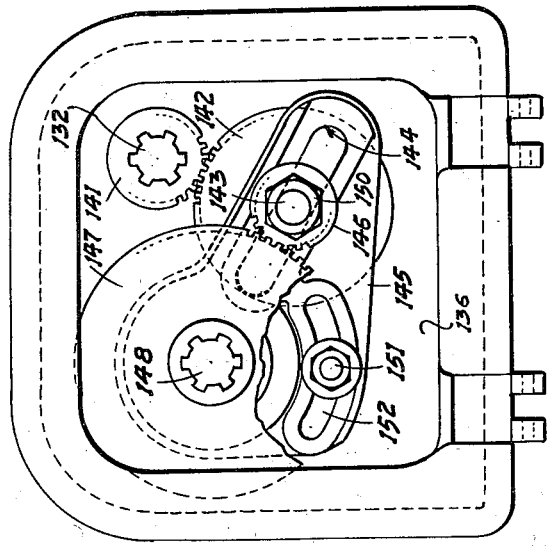

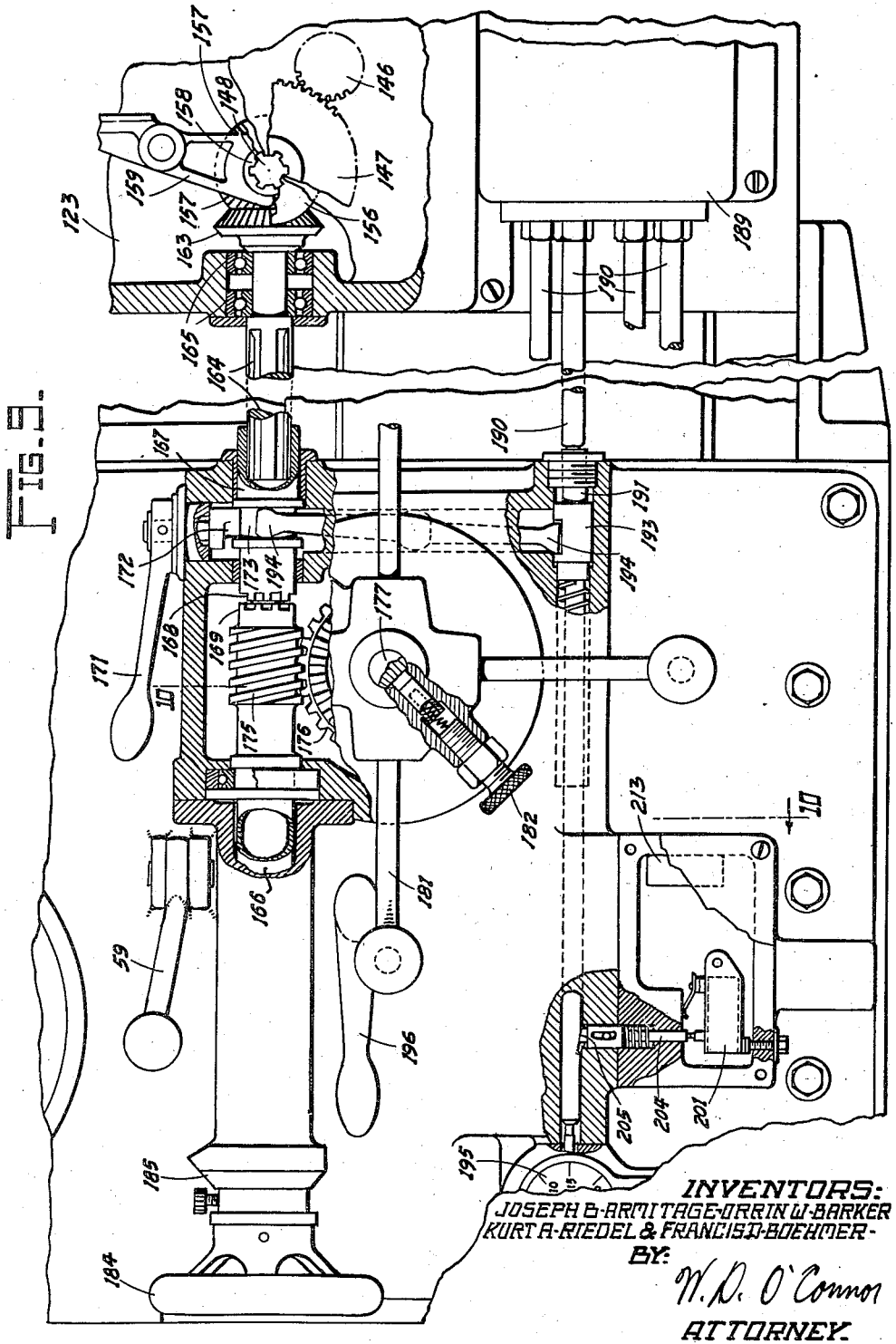

Oct. 30, 1945.     J. B. ARMITAGE ET AL     2,387,820
MACHINE TOOL
Filed April 30, 1942     10 Sheets-Sheet 8
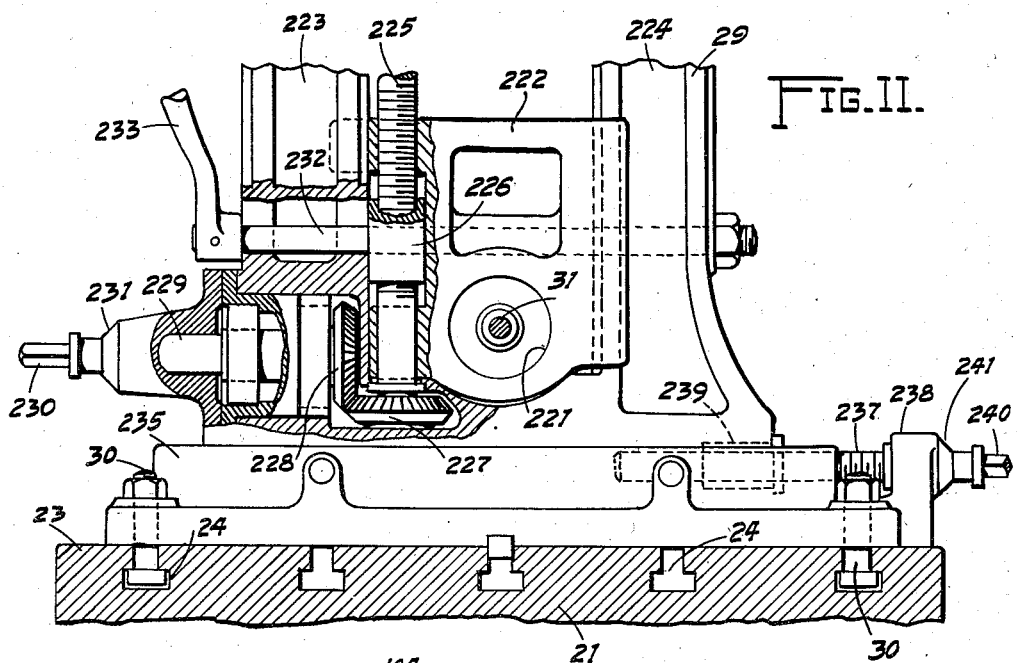
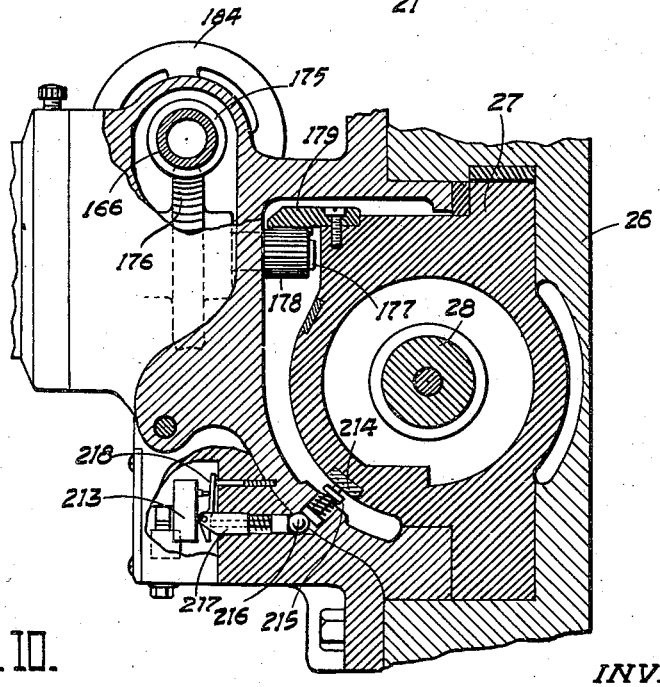
INVENTORS:
JOSEPH B. ARMITAGE — ORRIN W. BARKER —
KURT A. RIEDEL & FRANCIS D. BOEHMER —
BY:
W. D. O'Connor
ATTORNEY.

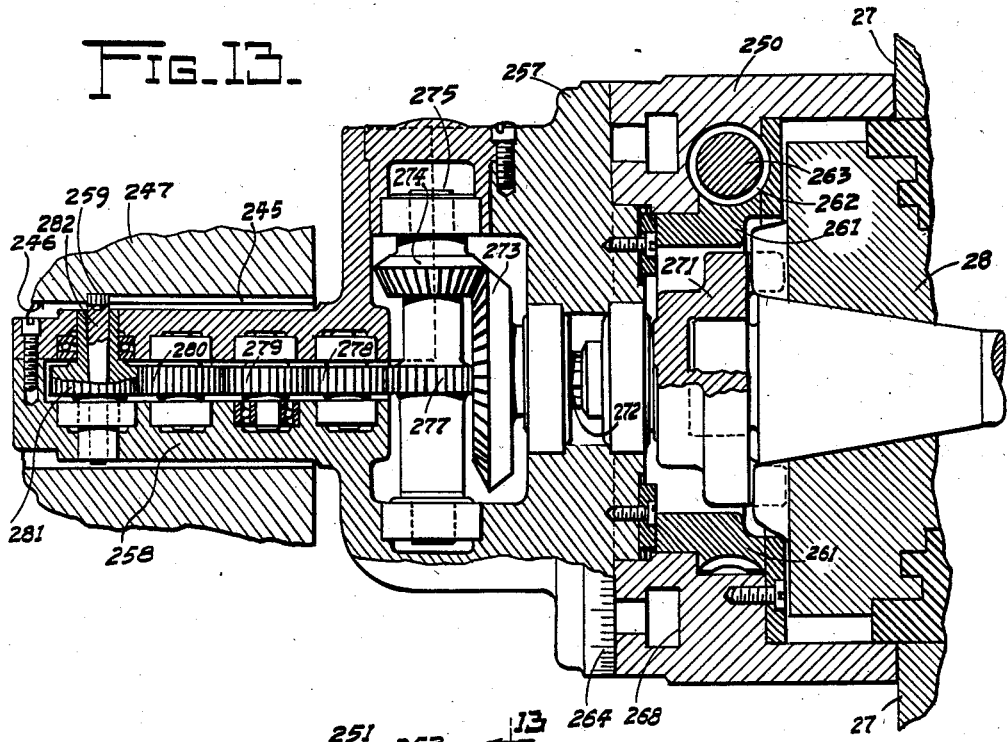
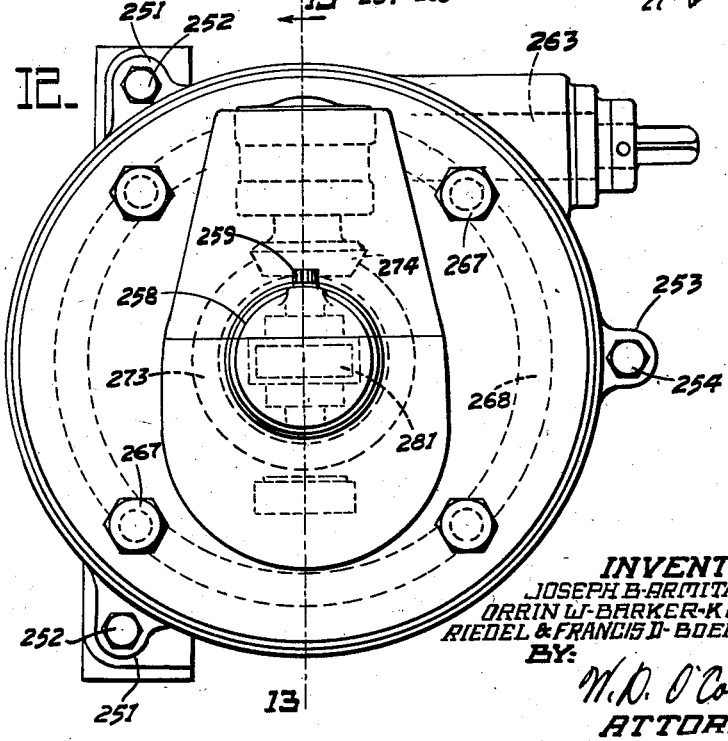

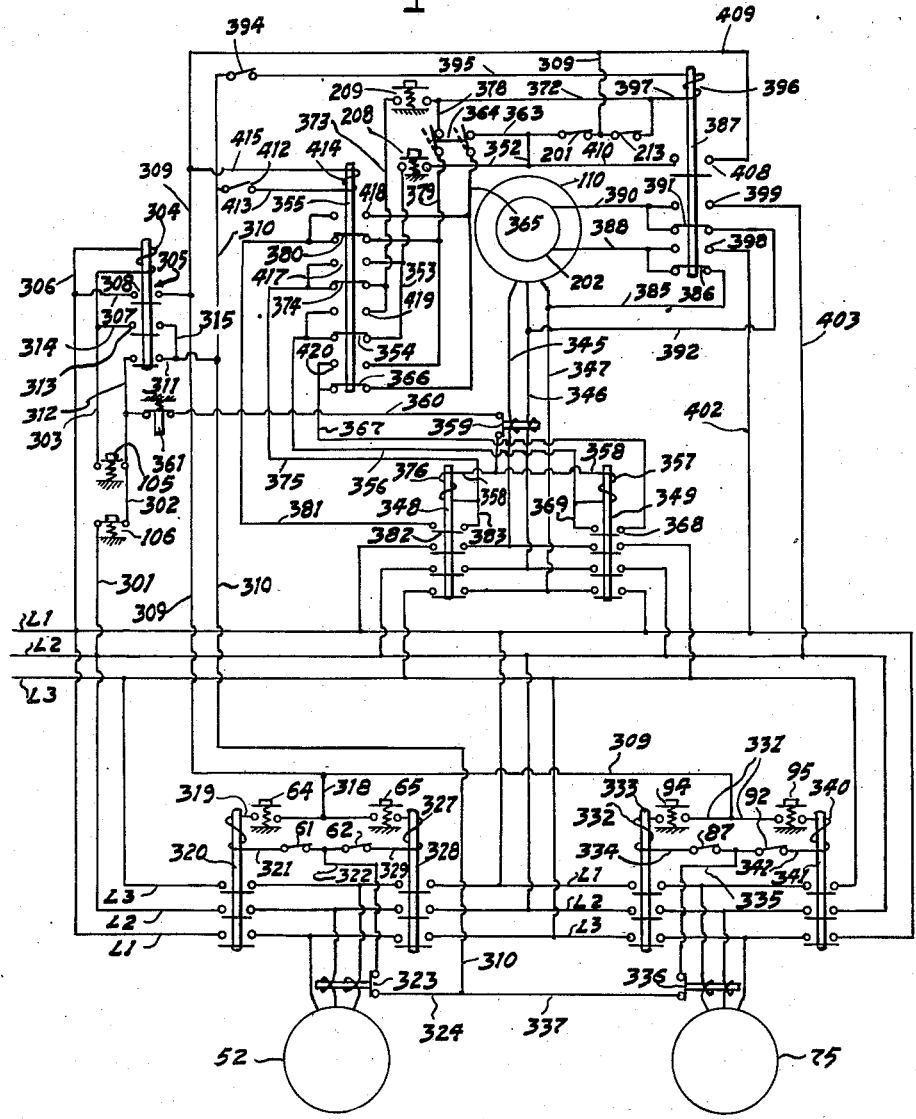

Patented Oct. 30, 1945

2,387,820

UNITED STATES PATENT OFFICE 2,387,820

MACHINE TOOL

Joseph B. Armitage, Wauwatosa, and Orrin W. Barker, Kurt A. Riedel, and Francis D. Boehmer, Milwaukee, Wis., assignors to Kearney & Trecker Corporation, West Allis, Wis., a corporation of Wisconsin Application April 30, 1942, Serial No. 441,146

17 Claims. (Cl. 29—26)

This invention relates, generally, to machine tools and more particularly to improved structural arrangements and novel driving and controlling apparatus for a machine tool such as a boring and threading machine.

A general object of the present invention is to provide an improved machine tool especially adapted to perform boring or threading operations conveniently and with a high degree of precision.

Another object of the invention is to provide an improved boring and threading machine arranged to cut threads of either hand throughout a wide range of pitches.

Another object of the invention is to provide improved mechanism for actuating and for controlling the movements of the operating elements of a machine tool.

Another object is to provide a threading machine including depth measuring apparatus and control means associated therewith for stopping the threading feed promptly upon arrival at a predetermined depth.

Another object is to provide an improved electrical control system for a machine tool.

Another object is to provide an improved electrical control system that is especially arranged to condition a machine tool for performing either a boring operation or a threading operation selectively.

A further object is to provide a thread cutting control including advancing and retracting feed control switches together with a conditioning switch operable to maintain the directional characteristics of the feeding switches for either direction of operation of the cutter spindle.

According to this invention, a boring and threading machine is constituted by a base presenting a fixed work supporting surface and serving as a foundation for a cooperating spindle carrying upright slidably mounted for movement along one side of the work supporting surface. The upright carries a vertically adjustable spindle head provided with a ram in which a tool supporting spindle is rotatably mounted, the arrangement being such that the spindle may be moved to any position above or at the side of and below the work supporting surface. The spindle is driven by an electric motor mounted on the head and the ram is arranged to be driven in feeding movement in boring or threading operations by power derived from the spindle. The ram feeding mechanism includes reversing gearing, shiftable range changing gearing, and lead changing pick-off gearing arranged to provide for cutting either right or left hand threads of desired pitch throughout a wide range. A forward feeding or threading operation may be terminated at any one of several preselected positions by means of a multiple position stop mechanism arranged to disengage the ram feed or alternatively to actuate a limit switch which de-energizes the motor and applies a brake, another limit switch being arranged to stop the motor and apply the brake at the retracted position of the ram. Directional controls for the ram may be conditioned by a selective switch to insure the desired direction of ram feeding movement for either direction of spindle rotation. Other controls provide for rendering the forward limit switch and the brake inoperative selectively and for conditioning the controls to effect inching movements of the ram by means of the directional controls. Separate motors are provided for traversing the upright and for elevating the head by means of the usual screw and nut mechanisms, the screws in this instance being driven by worm wheels and cooperating worms. The two motors are directly connected to the respective worms that are also provided with hand wheels for effecting manual adjustments. Accurate positioning of the upright is accomplished with the aid of measuring rods cooperating with a dial indicator, a limit switch being associated with the indicator for stopping the driving motor when the upright arrives at a predetermined position. Further precise adjustment may then be effected by the hand wheel under guidance of the dial indicator. Other limit switches are provided to limit movement of the upright in the other direction and to limit the vertical movements of the spindle head.

The present invention is exemplified herein by means of an embodiment thereof in a boring and threading machine of the horizontal spindle type. However, it is to be understood that the particular mechanism herein set forth is intended to be illustrative only and that apparatus of different construction may be utilized in practicing the several characteristics of the invention within the range of equivalents of the structures defined in the subjoined claims.

The foregoing and other objects of this invention, which will become more fully apparent from the following detailed description, may be achieved by the exemplifying apparatus depicted in and further described in detail in connection with the accompanying drawings, in which:

Fig. 2 is a general plan view of the machine shown in Fig. 1;

Fig. 3 is another general view of the machine, taken partly in end elevation and partly in vertical section along the lines 3—3 of Figs. 1 and 2, with parts broken away to show the spindle support moving mechanism;

Fig. 4 is an enlarged detailed fragmentary view of the upright positioning mechanism, taken largely in vertical section along the lines 4—4 of Figs. 1 and 2;

Fig. 5 is another fragmentary detailed view of the upright positioning mechanism, taken in vertical section along the lines 5—5 of Figs. 3 and 4;

Fig. 7 is a longitudinal vertical sectional view through part of the spindle ram feeding mechanism, taken along the line 7—7 of Fig. 6;

Fig. 8 is another longitudinal vertical section, taken along the line 8—8 of Fig. 6 showing the feed changing gear bracket;

Fig. 9 is a fragmentary view, partly in vertical section through parts of the spindle head and ram, showing the ram feeding and controlling mechanism, taken generally along the lines 9—9 of Figs. 2 and 3;

Fig. 10 is a detailed fragmentary view in transverse vertical section through the spindle head and ram, taken along the line 10—10 of Fig. 9;

Fig. 11 is a fragmentary view, partly in vertical section taken along the lines 11—11 of Figs. 1 and 2, showing details of the adjustable outboard arbor support;

Fig. 12 is an enlarged view in end elevation of a cutter carrying attachment that is especially adapted when mounted on the ram of the machine, to operate in a restricted space;

Fig. 13 is a view in longitudinal section through the attachment, taken along the line 13—13 of Fig. 12; and, Fig. 14 is a schematic circuit diagram of the electrical control system for the actuating motors of the machine.

Figure 1:
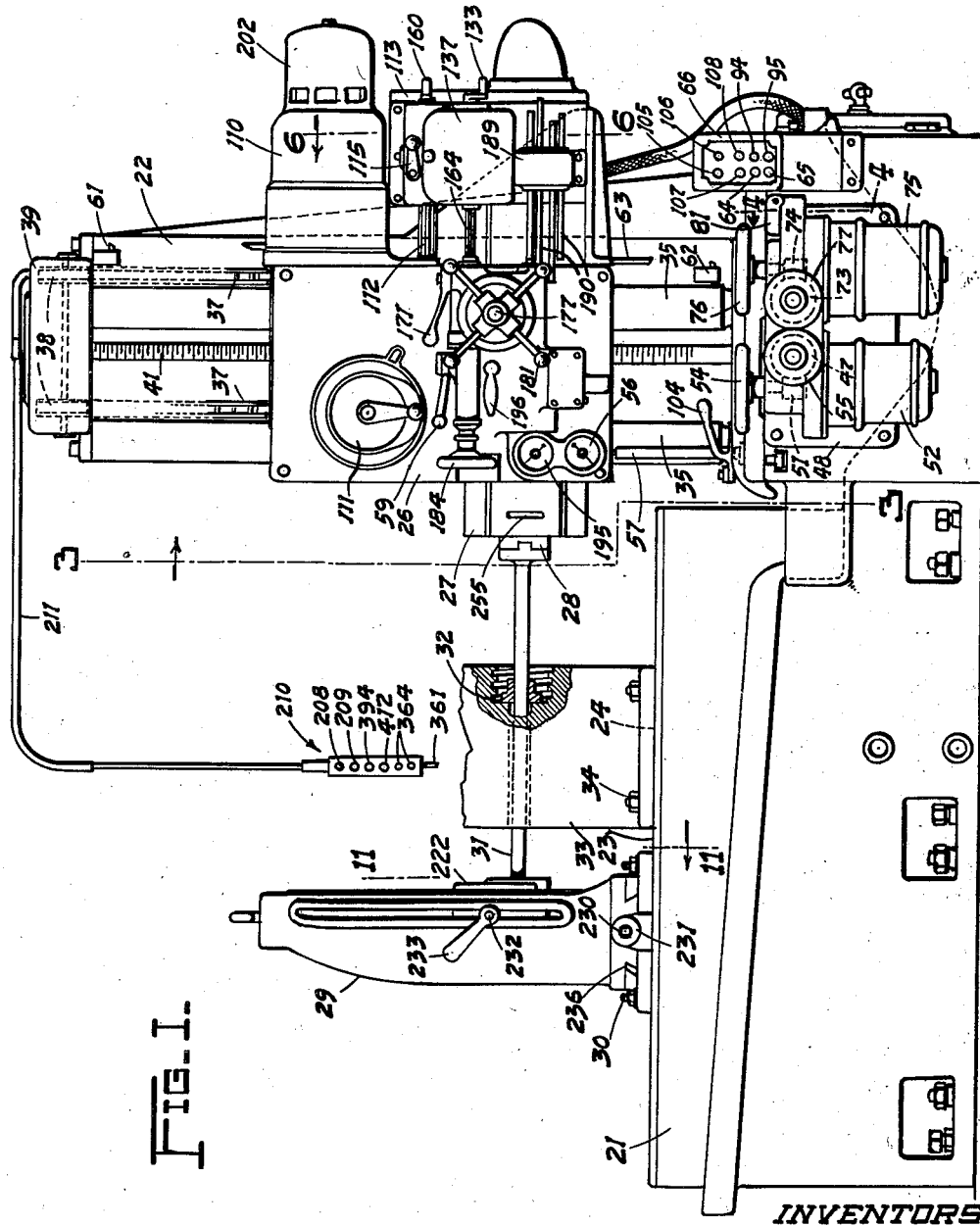
Figure 1 is a general view in front elevation of a horizontal boring and threading machine illustrative of the type of machine tool in which the present invention may be incorporated to advantage.

The particular exemplifying machine tool shown in the drawings as a preferred embodiment of the present invention is a special boring and threading machine of the horizontal spindle type, although it is to be understood that various characteristics of the invention may be utilized advantageously in other machine tools of different construction.

Referring more specifically to the drawings and particularly to Figs. 1, 2 and 3 thereof showing generally the boring and threading machine described herein by way of a complete disclosure of the invention, it will be seen that the apparatus is constituted essentially by a fixed base or bed 21 with which is associated a relatively movable tool spindle supporting upright 22. As shown, the bed 21 is a rigid structure of hollow construction, presenting at its top an elevated fixed work receiving surface 23 fitted with the usual spaced T-slots 24, and having formed at one side of and below the level of the work receiving surface an integral upright supporting surface or foundation 25. The upright 22 likewise is of hollow construction and is slidably mounted on the surface 25 for adjusting movement transversely of the work receiving surface 23. A self-contained spindle supporting head 26 is carried by the upright and is arranged for vertical sliding adjustment along its face, the head in turn carrying a slidably mounted horizontally disposed spindle ram 27 in which a cutter driving spindle 28 is rotatably supported. The arrangement of the movable supporting structure is such that a cutter carried by the spindle 28 may be moved in three mutually transverse planes for universal adjustment relative to the work supporting surface 23.

As shown in Fig. 1, the spindle 28 may have cooperating with it an outboard supporting structure 29 that may be secured on the work supporting surface 23 by means of T-bolts 30 in position to support the outer end of a cutter carrying arbor 31, which is fitted in and has driving connection with the spindle 28. The arbor 31, in turn, serves to support a cutter 32 for effecting a cutting operation upon a work piece 33 fixed on the work receiving surface 23 by clamping T-bolts 34 that cooperate with the T-slots 24.

As best shown in Fig. 3, the spindle carrying head 26 slides vertically along ways 35 at the front of the upright 22 and is counterbalanced by means of a counterweight 36 arranged for vertical movement within the hollow interior of the upright. The counterweight is connected to exert force upward upon the head 26 by means of a pair of chains 37 which operate over idler sprocket wheels 38 carried in a bracket or cap 39 secured to the top of the upright 22, the arrangement being such that the force exerted by the chains 37 upon the head facilitate its adjustment along the upright.

Adjustment of the vertical position of the head 26 is effected by means of an elevating screw 41 that is rotatably mounted in vertical position at the front of the upright and that cooperates with a nut 42 fixed in the spindle head. Rotation of the elevating screw 41 is effected by means of a bevel gear 43 fixed on its lower end and disposed in mesh with a similar bevel gear 44 that is rotatably mounted in a bracket 45 depending from the upright 22. As shown in Fig. 5, the bevel gear 44 has splined connection with a shaft 46 that is journalled in the bed 21 in position parallel with the direction of movement of the upright 22, the arrangement being such that a driving connection is maintained between the shaft 46 and the bevel gear 44 at any position of the upright 22 along its supporting surface 25 on the bed.

The splined shaft 46 projects forward through the face of the bed 21 and is provided near its forward end with an actuating worm wheel 47 that is housed within a bracket 48 fixed on the front of the bed, as shown in Fig. 1. The worm wheel 47 is engaged by a vertically disposed driving worm 51 which is rotatably mounted in the bracket and is connected at its lower end to the shaft of a vertically positioned electric motor 52 that is flanged to and depends from the bracket 48. At its upper end, the worm 51 is connected to a short shaft 53 projecting upward through the top of the bracket 48 and carrying at its upper end an exposed hand wheel 54, the arrangement being such that the spindle head 26 may be moved by power by means of the motor 52 approximately to a predetermined position and then adjusted precisely to the desired position by manually actuating the hand wheel 54.

For indicating the position of the head 26 approximately, the forward end of the actuating shaft 46 is provided with a micrometer dial 55. To provide for more precisely indicating the exact position of the head, a sensitive dial indicator 56, shown in Fig. 1, is carried by the head and connected with linkage disposed to cooperate with the upper end of a vertically disposed measuring rod 57 of predetermined length, the lower end of which engages an abutment or anvil 58 on a horizontal surface of the upright below the head, as shown in Fig. 3, the arrangement being such that when the head is moved by means of the hand wheel 54 to the predetermined position for which the measuring rod is selected, the dial indicator 56 will be actuated to indicate the terminal position precisely. After the head has been positioned, it may be clamped to the upright 22 by actuating a clamping lever 59 which operates clamping mechanism of the type disclosed and claimed in Patent No. 2,263,404 to Armitage and Barker.

To obviate the possibility of the head 26 being moved under power beyond safe limits, the upright 22 is provided with an upper limit switch 61 and a lower limit switch 62, arranged to be actuated upon engagement by trip dogs on the head at the respective ends of its course of vertical travel and operatively connected to de-energize the motor 52. To insure against accidentally bringing the ram 27 down upon the work surface 23 of the bed, the head 26 is provided on its lower surface with an extending trip element or dog 63 that is arranged to contact and actuate the lower limit switch 62 before the ram reaches the table surface, the dog 63 being removable to permit further lowering of the head under control of a fixed limit dog when the ram is being operated in retracted position. Operation of the motor 52 in the one or the other direction to cause raising or lowering of the head 26, is effected by means of controlling push buttons 64 and 65 mounted on a control panel 66 projecting upward from the right front corner of the bed 21.

Horizontal adjustment of the upright 22 along the supporting surface 25 is effected by means of a horiozntally disposed screw 71, best shown in Fig. 4, which cooperates with a nut 72 depending from and fixed to the lower surface of the upright. The screw 71 extends through the front of the bed 21 into the bracket 48 and is provided on its extending end with an actuating worm wheel 73 similar to the worm wheel 47 for effecting vertical movement of the head. As appears in Fig. 1, the worm wheel 73 is housed within the bracket 48 adjacent to the worm wheel 47 and is similarly engaged for operation by a vertically disposed worm 74 the lower end of which is connected to a vertical positioned traversing motor 75 and the upper end provided with an external hand wheel 76 for manual actuation. To indicate approximately the extent of movement of the upright 22 by means of its actuating mechanism, the screw 71 is provided at its forward end with a micrometer dial 77.

For more precisely positioning the upright 22, there is provided at the front of the machine, as shown in Figs. 2 and 4, a sensitive dial indicator mechanism 81 that is mounted in the bracket 48 and arranged to cooperate with a series of measuring rods 82 interposed end to end between the indicator and the base of the upright. As shown in Figs. 4 and 5, the measuring rods 82 are supported in a V-shaped groove or trough formed in a guide member 83 fixed in the supporting surface 25 of the bed 21. The rods 82 are engaged at the inner end by an abutment element 84 fixed on the lower forward surface of the upright 22, and they engage at the outer end a sliding plunger 85. The plunger 85 is arranged to engage at its other end the operating stem of the dial indicator which resiliently urges it in direction toward the upright. The plunger is slidably mounted for free movement in a sleeve 86 that is in turn slidably mounted in a bore in the bracket 48. By this arrangement, the upright 22 may be moved a predetermined distance by first setting the dial indicator 81 to a known position in cooperation with a measuring rod combination of known length and then substituting for the known measuring rod 82 another measuring rod combination differing in length by the amount of movement required, after which the upright 22 is moved until the indicator 81 is returned to the known position by action of the new measuring rod.

To avoid injury to the mechanism in the event that the upright 22 is moved by power into engagement with the measuring rod 82, there is provided in the bracket 48 a forward limit switch 87 that is arranged to be actuated by a cam 88 on the sleeve 86 when it is moved forward by the measuring rod, and that functions to de-energize the motor 75 which drives the screw 71. As shown, the sleeve 86 is provided with a slot 89 that affords a lost motion connection with a cooperating pin in the plunger 85. A coil spring 90 associated with the sleeve 86 serves to urge it toward the left to withdraw the cam 88 from engagement with the limit switch 87 when the upright is again moved toward the rear of the machine.

By this arrangement, the upright 22 may be moved by the power of the motor 75 toward the front of the machine until it engages and moves the measuring rod 82 whereupon it will be stopped automatically approximately at the desired position. Further precise adjustment of the upright 22 may then be effected by manual actuation of the hand wheel 76 to move it to the position indicated by movement of the dial indicator pointer to its original known position. In the event that there is no measuring rod in the guide member 83, the upright 22 will be stopped at the forward end of its course of travel by the engagement of a trip dog 91 that projects forward from the upright 22 with the spring urged sleeve 86 carrying the cam 88 which controls the limit switch 87. As shown in Fig. 5, the trip dog 91 is of rectangular or square shape in section and is arranged to operate in a complementary groove formed in the guide member 83 at the bottom of the rod receiving V-groove.

To prevent movement of the upright 22 too far in the other direction, there is provided a second or rear limit switch 92, shown in Fig. 5, mounted in the base 21 beneath the upright in position to be engaged by an actuating cam 93 depending from the bottom of the upright. Energization of the motor 75 to cause movement of the upright 22 in the one or the other direction, is effected by means of push buttons 94 and 95 on the control panel 66.

As best shown in Fig. 5, the upright is fitted in ways 96 formed on the supporting surface 25 and adjusted thereto by means of a gib 97. After the upright 22 has been moved to the predetermined position of adjustment, it may be clamped to the supporting surface 25 by means of two spaced clamping T-bolts 98 and 99 that are carried by the upright and that operate along a cooperating T-slot 101 in the bed 21. In order that the bolts 98 and 99 may be actuated simultaneously, each bolt is provided with a cooperating nut 102 having a radially extending arm, the ends of the nut arms being pivotally connected to the respective ends of an interconnecting link 103. As shown in Figs. 3 and 5, the nut 102 on the forward bolt 98 is provided with a hand lever 104 by means of which both nuts may be tightened simultaneously in clamping the upright to the bed.

Control of the power operation of the entire machine is effected by master push buttons 105 and 106 mounted at the top of the control panel 66. Another set of control buttons, 107 and 108 serve to control the motor of a coolant pump unit 109 that functions to provide coolant liquid to the cutter 32 driven by the spindle 28.

Figure 6:
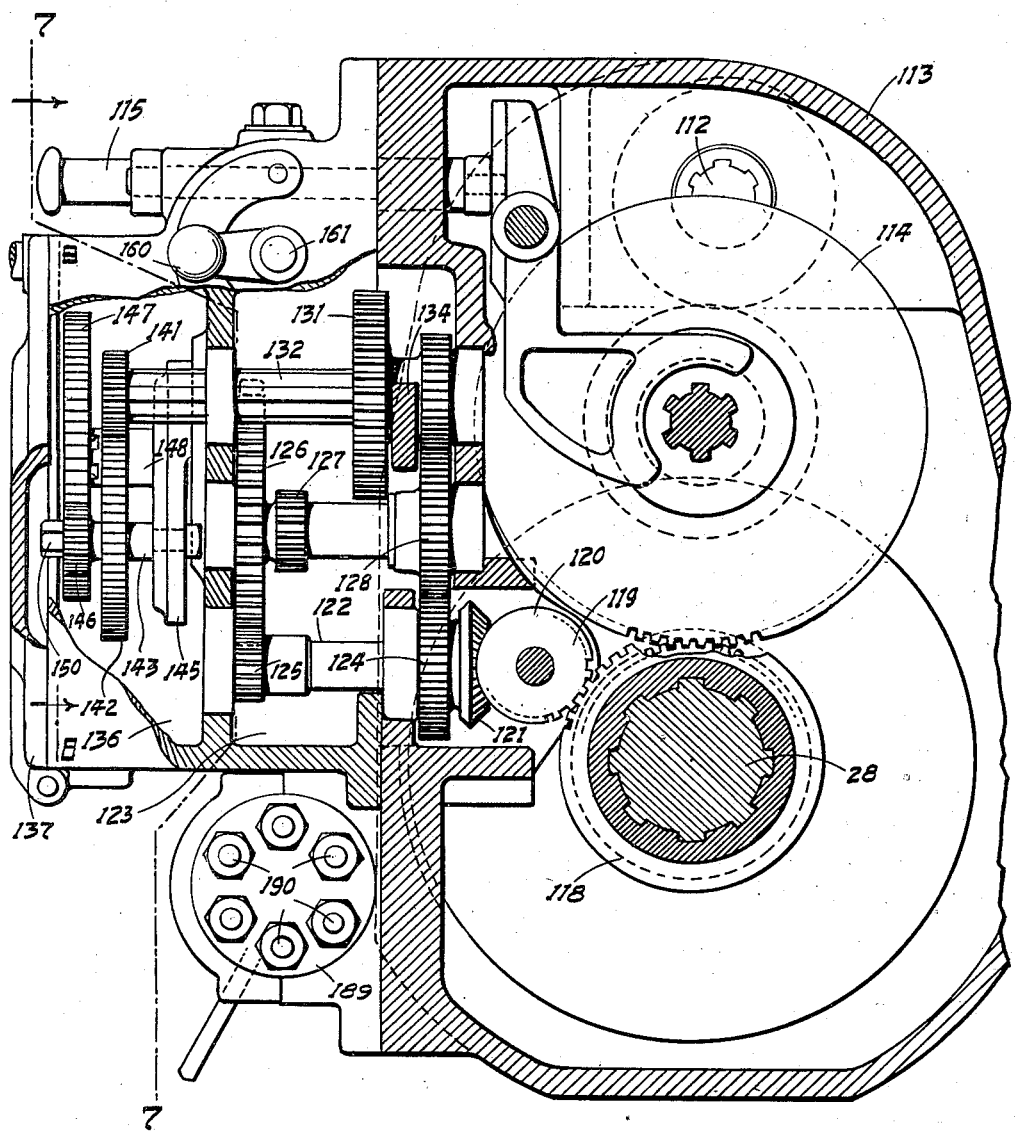
Fig. 6 is a view in vertical transverse section through the spindle carrying ram structure and its driving mechanism, taken along the line 6—6 of Fig. 1.

Power for rotating the cutter driving spindle 28 and for effecting feeding movement of the ram 27 is derived from a spindle driving motor 110 that is mounted on the spindle head 26 for bodily movement with it. As appears in Fig. 1, the motor 110 is connected to drive a speed changing mechanism housed within the spindle head 26, that is arranged to provide a predetermined driving ratio upon being adjusted by means of an adjusting crank and cooperating speed indicating dial mechanism 111 mounted on the forward side of the head. Power at the selected speed ratio is transmitted by means of a splined shaft 112 to an upwardly extending housing 113 carried on the rearward end of the horizontally sliding ram 27, the arrangement being such that driving connection is maintained regardless of the position of the ram in its sliding movement. As shown in Fig. 6, power from the shaft 112 is transmitted to the spindle 28 by means of a range changing gear couplet 114 within the housing 113 that may be shifted to either a high speed range or a low speed range position by means of a range changing lever 115 mounted on the front of the housing, the arrangement being such that the spindle 28 may be driven at any speed within the combined ranges of the speed changer and the range change couplet 114.

Power for effecting axial feeding movement of the ram 27 is derived from the spindle 28, the arrangement being such that the ram may be moved in synchronism with rotation of the spindle to provide for effecting thread cutting operations. As shown in Fig. 6, the spindle 28 is provided for this purpose with a spur gear 118 that meshes with a spur pinion 119 rotatably mounted in the housing 113 on an axis parallel with the spindle. The pinion 119 is connected with a bevel pinion 120, as best shown in Fig. 7, that meshes with a complementary bevel pinion 121 on the inner end of a shaft 122 that projects transversely into a gear chamber 123 at the front of the housing 113. The shaft 122 is provided within the chamber 123 with a gear 124 and a pinion 125. The pinion 125 provides for a low range of feeding movement and has meshing engagement with a relatively large gear 126 that is connected with another pinion 127. The gear 124 provides for a high range of feeding movement and is disposed to mesh with a gear 128 of substantially equal diameter. A shiftable range changing couplet 131 is slidably splined on a shaft 132 in manner to be movable into meshing engagement with either the high speed range gear 128 or the low speed range gear 127. Shifting movement of the range changing couplet 131 is accomplished by means of a range changing shift lever 133, shown in Figs. 1 and 7, at the end of the gear chamber 123. The lever 133 may be turned to actuate a shifting fork 134 which engages the couplet 131 in manner to slide it along the splined shaft 132 and it has a neutral position in which the couplet is disengaged from both the low speed pinion 127 and the high speed gear 128.

The splined shaft 132 projects outward from the chamber 123 into a lead changing pick-off gear chamber 136 at the side of the housing 113, to which access may be had by opening a hinged cover 137. The end of the shaft 132 within the chamber 136 is adapted to receive a removable pick-off gear 141 that meshes with a complementary pick-off gear 142 journalled on a spindle 143 that is slidably fitted in a slot 144 of a change gear bracket, as best shown in Fig. 8. The gear 142 is connected with a smaller gear 146 in manner to constitute a couplet, and the gear 146 in turn meshes with another pick-off gear 147 that it removably fitted on the end of a driven splined shaft 148. The pick-off gears between the shafts 132 and 148 constitute a rate or lead changing mechanism that functions in cooperation with the range changing couplet 131 to drive the ram in axial feeding movement at any one of a multiplicity of rates.

As best shown in Fig. 8, the change gear bracket 145 is pivotally mounted concentric with the shaft 148, the arrangement being such that the spindle 143 may be moved along the slot 144 to mesh the gear 146 with the gear 147, and the bracket 145 may then be pivoted about the shaft 148 to mesh the gear 142 with the driving pick-off gear 141. After the gears have been meshed, a nut 150 on the spindle 143 may be tightened to clamp the spindle in adjusted position in the slot 144 of the bracket 145, and a clamping bolt 151 which operates in an arcuate slot 152 in the bracket 145, may be tightened to hold the bracket in an adjusted position.

The driven shaft 148 which carries the pick-off gear 147 extends back into the gear chamber 123, as indicated in Fig. 9, and has rotatably mounted thereon opposed bevel gears 156 and 157 constituting a reversing mechanism for transmitting power in either direction selectively. A clutch spool 158 is slidably splined on the shaft 148 between the bevel gears and is arranged to be moved by means of a shifting fork 159 into driving engagement with either bevel gear. As indicated in Figs. 6 and 7, the shifting fork 159 is arranged to be actuated by a reversing lever 160 mounted on the end of the gear chamber 123, the lever being movable to two positions for forward and reverse operation, respectively, in controlling the direction of feeding movement of the spindle 28. The lever 160 is secured to the end of a control shaft 161 rotatably mounted in the upper part of the chamber 123, the other end of the shaft being provided with a cam element that engages the shifting fork 159 in well known manner to effect sliding movement thereof.

As appears in Figs. 7 and 9, the reversing bevel gears 156 and 157 both have meshing engagement with a complementary bevel gear 163, the arrangement being such that the gear 163 may be driven in the one or the other direction depending upon which of the meshing gears 156 and 157 is engaged by the clutch collar 158. The bevel gear 163 is fixed on the end of a splined shaft 164 which is disposed parallel with the spindle 28 and is rotatably supported by bearings 165 in the wall of the gear chamber 123. As appears in Figs. 1 and 9, the shaft 164 extends forward from the gear chamber 123 into a hollow shaft or sleeve 166 that is rotatably mounted on the front of the spindle head 26, the shafts being arranged to telescope to accommodate movement of the ram 27 and its associated gearing relative to the spindle head proper.

A selectively engageable driving connection is effected between the splined shaft 164 and the hollow sleeve shaft 166 by means of an axially slidable clutch sleeve 167 that has splined connection with the shaft 164 and is provided with clutch teeth 168 arranged to engage selectively with complementary clutch teeth 169 on the end of the hollow shaft 166. A hand lever 171 is arranged to actuate an eccentric 172 that engages a spool groove 173 in the clutch sleeve 167 for moving it into engaged or disengaged position.

The hollow sleeve shaft 166 is provided with a worm element 175 that is disposed to mesh with and drive a worm wheel 176 on a transverse shaft 177. As best shown in Fig. 10, the shaft 177 is provided at its inner end with a pinion 178 that meshes with a rack element 179 fixed on the ram 27, the arrangement being such that rotation of the hollow shaft 166 in the one or the other direction causes advancing or retracting movement of the ram. As shown in Figs. 1 and 9, the shaft 177 is provided at its forward end with a large star wheel or pilot wheel 181 by means of which the shaft may be turned manually to move the ram 27 at rapid rate, a clutch being arranged between the shaft 177 and the worm wheel 176 for releasing the shaft for manual rotation, as more fully explained in the previously mentioned Patent No. 2,263,404. To prevent unintentional disengagement of the star wheel clutch, which might interfere with a threading operation or the like, the star wheel is provided with a locking screw 182 by means of which the clutch may be locked in engaged position.

With both the clutch sleeve 167 and the star wheel clutch in engaged position, power will be transmitted from the tool spindle 28 to the ram actuating pinion 178 at the speed ratio determined by the setting of the range changing couplet 131 in combination with the ratio established by the pick-off gears in the chamber 138, and in the direction established by the position of the reversing clutch spool 158. Since the ram feeding mechanism is driven directly from the spindle 28, the advancing movement of the ram is definitely correlated with rotation of the spindle for effecting screw thread cutting or similar spiral operations, the pitch or lead of the spiral being determined by the driving ratio of the ram feeding train. After the desired driving ratio has been established, the actual speed of the cutting operation may be regulated by adjusting the spindle driving speed changing mechanism in the spindle head 26. To provide for close manual adjustment of the position of the ram 27, the sleeve shaft 166 is fitted at its forward end with a hand wheel 184 that carries a micrometer dial 185 for indicating the extent of movement effected.

When the machine is being utilized to effect a boring operation, it is desirable to feed the cutter spindle forward under power until the cutter approaches the predetermined position at which the cutting operation is to cease. The power drive is then automatically disengaged and the feeding movement continued manually by actuation of the hand wheel 184. As explained in the previously mentioned Patent No. 2,263,404, power advance of the ram may be automatically tripped out at any one of several preselected positions by operation of a turret stop mechanism 189 of the type covered by Patent No. 1,968,276 to Joseph B. Armitage. As best shown in Figs. 1 and 9, the turret stop mechanism 189 is mounted on the front of the ram gear chamber 113 and carries a plurality of adjustable stop rods or measuring rods 190 arranged to be moved selectively into operating position. The measuring rod 190 that is in the active position is disposed to abut the end of an actuating plunger 191 when the ram advances to the position for which the rod is adjusted. As shown, the plunger 191 is slidably mounted in the head 26 and is provided with a slotted sleeve 193 which engages the lower end of a pivoted lever 194. The upper end of the lever 194 engages the groove 173 of the shiftable clutch sleeve 167, the arrangement being such that when the plunger is moved to the left by the advancing ram, the lever 194 will pivot to move the teeth 168 of the clutch sleeve 167 out of engagement with the clutch teeth 169 on the shaft 166, thereby interrupting the power driving train for the ram feeding movement.

After advancing movement of the ram by power has been stopped by the trip mechanism, further movement to a precisely predetermined position may be effected manually by turning the hand wheel 184. For determining the position of the ram precisely in order to terminate the boring operation at a predetermined point, there is provided a sensitive dial indicator mechanism 195 mounted on the head 26 above the indicator 56. As shown in Fig. 9, the plunger 191 which is engaged by the turret stop rod 190 at its protruding end is arranged to engage at its other end with the stem of the dial indicator 195. As the ram is advanced by turning the hand wheel 184, the dial indicator is actuated by the plunger 191 to show with a high degree of accuracy the arrival of the ram at the predetermined position, the cutter spindle 28 meanwhile continuing to operate to complete the cut. If it is desired to retain the ram in the position to which it is adjusted, it may be clamped rigidly to the head 26 by actuating a clamping lever 196 in the manner more fully explained in previously mentioned Patent No. 2,263,404.

In performing a threading operation such as that illustrated in Fig. 1, it is desirable to arrange for retracting the cutting tool 32 after it has arrived at a predetermined inner limit, by turning it backward along the threads already cut. To accomplish this, the forward feeding operation is discontinued without disengaging the feed driving train and the cutter then retracted by operating the spindle driving mechanism in the reverse direction. To this end, a limit switch 201 is arranged to de-energize the spindle driving motor 110 and engage an electrically operated brake 202 for stopping the forward movement of the cutter 32 promptly at the end of a threading operation. As shown in Fig. 9, the limit switch 201 is arranged to be actuated by a spring urged plunger 204 that cooperates with a cam surface 205 on the indicator actuating plunger 191, the arrangement being such that when a stop rod 190 engages the plunger 191 at the end of an "out" movement of the ram, the limit switch 201 will be actuated to stop the driving motor 110 before the clutch sleeve 167 can be moved to disengaged position. Retracting movement of the threading cutter 32 along the threads cut in the work piece 33 is then effected by energizing the motor 110 for operation in the reverse direction. Since the ram driving mechanism remains engaged, a second cut may then be taken, after resetting the cutting tool, by again operating the motor in direction to advance the ram. Control of the motor 110 is effected by means of ram advancing and ram retracting push buttons 208 and 209, respectively, mounted in a pendant station 210 that is suspended above the work receiving surface 23 from the end of a radius arm 211 pivotally mounted on the top of the upright 22.

To prevent the ram 27 from being retracted by power beyond a predetermined limiting position, a second or "in" limit switch 213 is provided for stopping the motor 110 and applying the brake 202. As shown in Fig. 10, the retracting limit switch 213 is arranged to be actuated by means of a cam 214 fixed on the surface of the ram 27 in position to engage a spring pressed radially disposed plunger 215 when the ram arrives at its retracted position. The plunger 215 engages a ball 216 which acts upon a second plunger 217 disposed in horizontal position, at an angle to the plunger 215, and operatively connected through linkage 218 to actuate the switch 213.

The outboard supporting structure 29 which carries the outer end of the arbor 31 supporting the cutter 32 as indicated in Fig. 1, is shown more in detail in Fig. 11. As appears in the drawings, the end of the arbor 31 is rotatably and slidably received in a journal bearing 221 formed in a bearing block 222 that is slidably mounted for vertical adjustment between side members 223 and 224 constituting an upright guiding element. The bearing block 222 may be adjusted vertically along the upright to bring the journal bearing into alignment with the spindle 28, by means of a threaded shaft 225 that is disposed in vertical position and journalled at its ends in the top and bottom of the upright in manner to have threaded engagement with a nut 226 formed in the block 222. The shaft 225 may be turned by means of a bevel gear 227 fixed on its lower end and meshing with a similar bevel gear 228 fixed on the inner end of a horizontal shaft 229 that is journalled in the lower part of the side member 223. As shown, the shaft 229 projects toward the front of the machine and is provided at its outer end with a squared portion 230 for receiving a crank or the like by means of which the vertical adjustment may be effected. Associated with the outer end of the shaft 229, is a micrometer dial 231 for indicating the extent of vertical movement of the bearing block 222. After the bearing block has been moved to adjusted position, it may be clamped in place by tightening a clamping bolt 232 which extends through the block and operates to draw the side members 223 and 224 toward each other into clamping engagement with the sides of the block. A hand lever 233 is provided on the forward end of the rod 232 for turning it to effect the clamping action.

To provide for adjusting the position of the supporting journal 221 laterally into alignment with the spindle 28, the upright guiding element of the outboard support, constituted by the side members 223 and 224, is slidably fitted in a base 235 which is secured by the T-bolts 30 to the work supporting surface 23. As appears in Fig. 1, the upright is fitted to the base 235 by means of dove tails and a gib 236. Sliding movement of the upright along the base 235 may be effected by means of a screw shaft 237 that is journalled in a lug 238 projecting upward from the base and that has threaded engagement with a nut 239 formed in the lower end of the side member 224. The screw shaft 237 projects at the rear of the machine, as shown in Fig. 2, and is provided with a squared end 240 for receiving a crank or the like to effect the lateral adjustment. A micrometer dial 241 is associated with the shaft 237 for indicating the extent of the movement effected.

For performing milling operations in restricted spaces, the machine may be fitted with an attachment of the type shown in Figs. 12 and 13. This attachment is arranged to be mounted on the forward end of the ram 27 and functions to effect a slotting operation, for example, such as may be required in cutting a keyway 245 within a cylindrical opening 246 formed by a previous boring operation in a work piece 247. As shown, the attachment is constituted by a base or body portion 250 provided with upper and lower lugs 251 which are secured to the upper and lower slide elements of the ram 27 by means of bolts or cap screws 252. A third, intermediate lug 253 projects from the body 250 toward the front of the machine and carries a hook bolt 254 that engages a slot 255 cut in the forward side of the ram as shown in Fig. 1.

The base or housing 250 has rotatably mounted thereon a cutter head 257 presenting a narrow cutter carrying projecting arm 258 disposed coaxially of the spindle 28, from which a slotting cutter 259 projects laterally, the arm being arranged to carry the cutter into a restricted opening such as the bore 246. For adjusting the angular position of the projecting cutter 259, the head 257 may be turned angularly relative to the base 250. To effect the angular adjustment, the head 257 is provided with an annular worm wheel 261 extending within the housing 250 in position to have meshing engagement with a worm 262 journalled transversely of the housing. The worm 262 is formed on a shaft 263 provided with a squared projecting end for receiving a crank or the like to turn the worm in effecting the angular adjustment. A scale 264 is provided on the periphery of the rotatable head 257 for indicating its angular position. After the cutter has been adjusted to the desired angular position, the head 257 may be clamped to the housing 250 by tightening T-bolts 267 which project forward through the head and operate in an annular T-slot 268 formed in the forward face of the housing 250.

Power for driving the cutter 259 is derived from the main spindle 28, the end of which is engaged by a driving collar 271. The collar 271 is fixed on a shaft 272 that is journalled in the head 257 concentric with its axis of rotation. The shaft 272 is provided at its forward end with a bevel gear 273 which has meshing engagement with a smaller complementary bevel gear 274 fixed on a transverse shaft 275 supported at its ends in bearings in the head 257. The shaft 275 is provided at its mid-portion with a spur gear 277 which in turn meshes with the first of a train of spur gears 278, 279 and 280 rotatably mounted within the projecting arm 258 in position to transmit power along the axis of the head 257. The last gear 280 of the train meshes with a similar spur gear 281 mounted on a hollow spindle 282 into which the slotting cutter 259 is fitted.

In operating the machine with the slotting attachment in place on the end of the ram 27, the head 257 is first adjusted angularly to bring the cutter 259 into position to form a slot at the desired angular relationship to the bore, and the head clamped to the body 250. The speed changing gearing and the feed changing gearing of the spindle head 26 are then adjusted and the main motor 110 started in direction to effect forward feeding movement or advance of the ram. With the gearing properly adjusted, the cutter 259 will be turned by the gear train within the arm 258 at the desired cutter speed and the ram will be advanced at the predetermined feeding rate to feed the arm into the opening in the work piece in manner to cause the cutter to effect the desired slotting operation.

Referring now to the electrical circuit diagram shown in Fig. 14, electrical energy for operating the machine is derived from a power source represented by three phase line conductors L1, L2 and L3. As previously mentioned, the operation of the entire machine is under the control of the master push button switches 105 and 106 that function to energize or de-energize the control circuit for actuating the relays and switches associated with the several motors. When the master starting push button switch 105 is depressed, it closes an energizing circuit leading from the line conductor L2 through a conductor 301, the previously mentioned normally closed master stop push button 106, a conductor 302, the closed push button switch 105 and a conductor 303 leading to an actuating coil 304 of a master relay 305, a return conductor 306 then completing the circuit from the coil to the line conductor L1.

With the actuating coil 304 thus energized, the relay closes and energizes a control supply circuit which extends from the line conductor L1 through the conductor 306, a branch conductor 307, and closed contacts 308 of the relay 305 to a control source conductor 309. A return control source conductor 310 is simultaneously connected by closed contacts 311 of the relay 305, to a conductor 312 which connects with the conductor 302 leading to the push button 106 from which the conductor 301 returns to the line conductor L2. Simultaneously, another closed contact 313 of the relay 305 establishes a holding circuit in shunt relationship with the normally open master starting push button switch 105. The holding circuit thus established extends from the line conductor L1 through the conductor 306, coil 304, conductor 303, a branch conductor 314, the closed contact 313, a branch conductor 315, the closed contact 311 and thence by conductor 312, conductor 302, push button 106 and conductor 301, to the line conductor L2. By this arrangement, the master relay 305 will remain closed upon release of the push button 105, and the control circuit will remain energized until the holding circuit is broken by depressing the stop button 106.

In order to effect upward movement of the spindle head 26, its actuating motor 52 may be energized to turn in the required direction by depressing the "up" push button 64, as previously mentioned. This results in completing a control circuit extending from the control source conductor 309, through a branch conductor 318 and the closed push button switch 64, to an actuating coil 319 of a motor controlling switch 320. From the coil 319, the circuit returns through a conductor 321, the upper limit switch 61 and a conductor 322 which leads to an overload relay 323 associated with the motor 52 from which a conductor 324 returns to the other control source conductor 310. With the actuating coil 319 thus energized, the motor switch 320 is closed to effect a connection from line conductors L1, L2 and L3 to the motor 52 to cause it to operate in a direction resulting in upward movement of the spindle head. With the motor 52 thus energized, the head will continue to move upward until the push button 64 is released or until the upper limit switch 61 is engaged to open the control circuit.

For effecting downward movement of the spindle head 26, the previously mentioned "down" push button 65 is depressed to close a control circuit leading from the control source conductor 309, through the conductor 318 and the closed push button 65, to an actuating coil 327 of a motor switch 328. From the coil 327, the circuit returns through a conductor 329, the lower limit switch 62 and the conductor 322 that leads to the overload relay 323 from which the conductor 324 returns to the control source conductor 310. With the coil 327 energized, the switch 328 closes and effects a reversed connection from the line conductors L1, L2 and L3 to the motor 52, causing it to operate in direction for moving the head downward. With the motor 52 thus energized for reversed operation, downward movement of the head will continue until the push button 65 is released or the lower limit switch 62 is opened.

Movement of the upright along the base is controlled in similar manner, the forward push button 94 being depressed to cause the motor 75 to turn in direction to move the upright toward the front of the machine. As shown in the wiring diagram, this completes a control circuit from the control source conductor 309, through a branch conductor 331, the closed push button switch 94, an actuating coil 332 of a motor switch 333 and thence through a conductor 334, the closed forward limit switch 87 and a conductor 335 leading to an overload relay 336 associated with the motor 75, from which a conductor 337 leads to the control source conductor 310. Upon closing the motor switch 333 by energizing the coil 332 in this manner, the motor 75 is energized from the line conductors L1, L2 and L3 in manner to effect forward movement of the upright, the movement continuing until the push button 94 is released or the forward limit switch 87 is opened.

For moving the upright toward the rear of the machine, the previously mentioned push button 95 is depressed to complete a circuit from the control conductor 309 through the branch conductor 331, the closed push button switch 95, an energizing coil 340 of a motor switch 341, a conductor 342, the closed rear limit switch 92 and thence through the conductor 335, the overload relay 336 and conductor 337 to the return control conductor 310. Energization of the actuating coil 340 results in closing the switch 341 to effect a reversed connection from the line conductors L1, L2 and L3 to the motor 75 to cause it to turn in direction to effect rearward movement of the upright, the movement continuing until the button 95 is released or the limit switch 92 is opened at the end of the course of travel. The motor for actuating the coolant pump unit 109 is likewise arranged to be energized from the line conductors L1, L2 and L3 under the control of the previously mentioned push buttons 107 and 108, but since the control circuit for this motor is of standard, well known type it has not been illustrated in the wiring diagram.

The spindle driving motor 110 is provided with power line conductors 345, 346 and 347 that are arranged to be connected to the line conductors L1, L2 and L3, either directly or in reverse order, by one or the other of two motor energizing switches 348 and 349. These switches are arranged to be controlled by the previously mentioned ram and spindle controlling push buttons 208 and 209 carried by the pendant station 210. Upon depressing the ram advancing push button 208, a control circuit is established which leads from the line conductor L1 through conductor 306, branch conductor 307, closed contact 308 of the energized master relay 305, the control source conductor 309, the closed outer limit switch 201, a conductor 352, the closed push button switch 208, a conductor 353, closed contacts 354 of a direction selecting or conditioning relay 355 and thence by a conductor 356 to an actuating coil 357 of the motor switch 349. From the coil 357, the circuit returns through a conductor 358 to an overload relay 359 in the power lines to the motor 110, from which a conductor 360 leads to a normally closed emergency stop switch 361 mounted on the lower end of the pendant station 210. From the pendant stop switch 361 the circuit continues through the conductor 312, conductor 302, stop push button 106 and conductor 301, to the line conductor L2.

Energization of the coil 357 closes the switch 349 to cause the motor 110 to operate in a predetermined direction, and simultaneously establishes a holding circuit in shunt relationship with the push button switch 208. The holding circuit leads from the control source conductor 309 through the outer limit switch 201 and a conductor 353 to one pole of a double pole inching selector or conditioning switch 364. With the inching switch 364 closed, the circuit continues through a conductor 365, closed contacts 366 of the direction selecting relay 355, and thence through a conductor 367 to closed interlocking contacts 368 of the energized motor switch 349 from which a conductor 369 leads to the switch actuating coil 357. The holding circuit thus established retains the switch 349 in closed position even though the push button 208 may be released, and causes the motor 110 to effect advancing movement of the ram until the outer limit switch 201 is engaged and opened.

In similar manner, when the ram retracting push button 209 is depressed, a control circuit is established from the line conductor L1 through the closed master relay 305 and the control source conductor 309 to the closed inner limit switch 213 from which a conductor 372 leads to the closed push button switch 209. From the switch 209 a conductor 373 leads to closed contacts 374 of the direction selecting relay 355 and thence through a conductor 375 to an actuating coil 376 of the other spindle motor switch 348. From the coil 376, the return circuit leads through the conductor 358, overload relay 359, conductor 360, pendant stop switch 361, conductor 312 and conductor 302 to the master stop push button switch 106 from which the conductor 301 returns to line conductor L2.

With the coil 376 energized, the motor switch 348 closes to effect a reversed connection between the line conductors L1, L2 and L3 and the motor power conductors 345, 346 and 347 thereby effecting operation of the motor 110 in direction opposite to that effected by closing the switch 349. Likewise, the closed switch 348 establishes a holding circuit in shunt relationship with the push button 209. This holding circuit leads from the control source conductor 309 through the inner limit switch 213, the conductor 372, and a conductor 378, to the other pole of the closed inching selector switch 364 from which a conductor 379 leads to closed contacts 380 of the direction selecting relay 355 and thence through a conductor 381 to interlocking contacts 382 on the switch 348 from which a conductor 383 leads to the switch actuating coil 376. This holding circuit functions likewise to retain the switch 348 in closed position after the push button 209 has been released, the motor 110 continuing to operate to effect retracting movement of the ram until the inner limit switch 213 is engaged and opened.

As previously mentioned, the brake 202 associated with the motor 110 is arranged to be engaged automatically upon stopping the motor at the end of the course of travel of the ram. For automatically releasing the brake when the motor 110 is energized by closing either the motor switch 348 or the motor switch 349, a brake releasing circuit is established which extends from the motor conductor 347 through a conductor 385, closed contacts 386 of a brake controlling relay 387 and thence through a conductor 388 to the brake 202. The return circuit extends from the brake 202 through a conductor 390, closed contacts 391 of the brake relay 387 and a conductor 392 to the motor supply conductor 346. With the brake controlling relay 387 in the position shown in Fig. 14, energy is provided to release the brake whenever the spindle motor 110 is energized.

In the event that it is desired to operate the spindle motor according to a mode of operation in which the brake is not engaged when the motor is stopped, energy for retaining the brake in released position continuously may be obtained directly from the line conductors by energizing and thereby repositioning the brake controlling relay 387. Energization of the brake relay 387 is effected by closing a brake controlling switch 394, mounted on the pendant station 210, which results in completing a circuit from the control source conductor 310 through the closed switch 394 and a conductor 395 to an actuating coil 396 of the brake relay 387 from which the circuit returns through a conductor 397 and the inner ram limit switch 213 to the other control source conductor 309. Energization of the coil 396 moves the relay 387 upward from the position shown in the drawings, to open the contacts 386 and 391 and close contacts 398 and 399. This results in establishing a direct connection from the line conductor L1 through a conductor 402, the closed contact 398, and the conductor 388 to the brake 202 from which the return conductor 390 is now connected by the closed contact 399 with a conductor 403 leading to the line conductor L2. With the brake 202 thus energized, it will remain in "off" position regardless of whether or not the motor 110 is energized. However, since the inner limit switch 213 is in the brake relay controlling circuit, whenever the ram is retracted to the position at which the inner limit switch is opened, the brake relay coil 396 will be de-energized and the relay 387 will move to the position in which the brake is disconnected from the line conductors, whereupon the motor will be de-energized and the brake will be engaged at the same time to stop the motor quickly and prevent excessive inward movement of the ram.

When the machine is being utilized to effect a boring operation to a predetermined depth, it is desirable that the final feeding movement be effected manually, as previously explained, by actuating the hand wheel 184 in order to move the cutter to a position precisely indicated by the dial indicator 188. For this purpose, it is preferable that the forward feeding movement of the ram be stopped through moving the clutch sleeve 167 to disengaged position upon engagement of a stop rod 190 of the turret stop 189 with the control rod 191 which also serves to actuate the "out" limit switch 201. Since the limit switch is arranged to function before sufficient movement of the rod 191 has occurred to disengage the clutch, it is necessary that the limit switch be rendered inactive whenever it is desired to effect a boring operation in this manner. For this purpose, the brake selecting relay 387 is provided with an auxiliary contact 408 that is arranged to be closed when the brake selecting switch 394 on the pendant station is closed. This establishes a circuit in shunt relationship to the "out" limit switch 201 extending from the control source 309 through a conductor 409, the closed contacts 408 and a conductor 410 which leads to the conductor 352 at the other side of the limit switch 201. With the limit switch 201 thus shunted out of the circuit, the ram 27 may be advanced in a boring operation until the turret stop 189 effects disengagement of the clutch sleeve 167. Feeding movement of the ram will then cease while rotation of the cutter spindle 26 will continue. The ram may then be advanced manually by means of the hand wheel 184 until the indicator 188 shows that the boring operation has proceeded precisely to the predetermined position.

For effecting intermittent operation of the spindle motor 110 under the directional control of the push buttons 208 and 209, as may be desirable when setting up the machine prior to operating upon a work piece or when shifting the speed changing gearing, the circuit may be adapted to this mode of operation by opening the inching selector switch 364. This interrupts the holding circuits for the motor switches 348 and 349 thereby permitting the switches to open upon release of the respective push buttons, making the motor 110 directly responsive to closing or opening of the push button switches 208 and 209.

As previously mentioned, the spindle motor controlling push buttons 208 and 209 are designated to effect spindle advancing and spindle retracting movements respectively, this being effected by operating the spindle motor 110 in the one or the other direction. For boring operations, the cutting tool ordinarily can be arranged for operation in the direction corresponding to the desired feeding response obtained from operation of the directional push buttons. However, for some operations, such as thread cutting, it is necessary that the spindle turn in one or the other direction relative to advancing movement of the ram, as may be required for cutting right-hand or left-hand threads or similar operations. This desired relationship of movements is established by properly positioning the ram feed reversing spool 158 through actuating the reversing lever 160. In order to maintain the directional control effected by the push buttons 208 and 209 when the direction of ram feeding movement relative to the direction of rotation of the motor 110 is thus reversed, the direction selecting relay 355 is arranged to effect a compensating reversal of the control connections between the motor switches and the controlling push buttons and limit switches.

As previously explained, the ram advancing push button 208 is connected, when the direction selecting relay 355 is in the position shown in the drawings, to effect control of the motor switch 349, while the ram retracting button 209 effects control of the switch 348. If now it is desired to change the relationship of spindle rotation to ram movement, the ram reversing lever 160 is moved to its other position and the direction selecting relay 355 is likewise shifted to its other position to reverse the controls.

As shown in the wiring diagram, the direction relay 355 is controlled by means of a direction selecting switch 412 that is mounted on the pendant station 210. When closed, this switch establishes a circuit from the control source conductor 310, to a conductor 413, leading to an actuating coil 414 of the relay 355 from which a conductor 415 returns to the other control source conductor 309. When the actuating coil 414 is thus energized, the relay 355 is moved to its upper position, thereby opening the connection from the ram advancing push button 208 through the contact 354 to the motor switch 349 and establishing a connection through contacts 417 to the conductor 375 leading to the actuating coil of the motor switch 348. Likewise, the connection through the holding circuit leading from the "out" limit switch 201, through contacts 366 of the direction selecting relay, to the holding contacts 368 of motor switch 349, is opened and a new holding circuit established by closing a contact 418 of the relay which effects a connection through the conductor 381 to the holding contacts 382 of the switch 348.

In like manner, ram retracting control button 209 is disconnected from motor switch 348 by opening contacts 374 of the directional relay and a new circuit established through contacts 419 which connect to the conductor 356 leading to the actuating coil 357 of motor switch 349. The connection through the holding circuit leading from the "in" limit switch 213 to motor switch 348 is also broken by opening contacts 380 of the relay 355 and a new holding circuit connection established through contacts 420 which connect with conductor 367 leading to the holding circuit contacts 368 of motor switch 349. With the control circuits thus rearranged by shifting the direction selecting relay 355, the ram 27 will respond to the advancing and retracting push buttons 208 and 209 in the same manner as before reversal of the ram feeding train by the reversing lever 160 but with the spindle operating in the other direction to cut the required helix.

The pendant stop switch 361, being in the return circuit from the spindle motor control to the line conductor L2, is not effected by operation of either the brake selecting relay 387 or the direction selecting relay 355 and continues to be operative to de-energize and stop the spindle motor 110 whenever it is moved to open position, as may be required in an emergency.

From the foregoing explanation of the boring and threading machine herein set forth to exemplify the present invention, it will be apparent that there has been provided an improved machine tool especially adapted to perform boring and threading operations and the like with a high degree of efficiency and accuracy.

Although the illustrative embodiment of the invention has been described in detail for the purpose of setting forth a practical exemplifying structure, it is to be understood that the particular apparatus herein described is intended to be illustrative only and that various characteristics of the invention may be incorporated in other structural forms without departing from the spirit and scope of the invention as defined in the subjoined claims.

The principles of the invention having now been fully explained in connection with the foregoing description of an illustrative preferred embodying structure, we hereby claim as our invention or discovery:

1. In a threading machine, a ram arranged for axial feeding movement, a cutter carrying spindle rotatably mounted in said ram, an electric motor operatively connected to drive said spindle, feeding mechanism operative to effect feeding movement of said ram and arranged to be driven by said spindle, said feeding mechanism including a range changing shiftable gear, a lead changing pick-off gear set and a selective reversing gear said gears being so arranged that threads may be cut at any one of a large variety of pitches and of either hand, an electrical control system for said electric motor including directional switches operative to effect advancing and retracting movements of said ram and spindle, and a conditioning switch arranged to be set in accordance with the adjustment of said reversing gear and operative to condition said directional switches to effect the desired movements of said ram without regard to the direction of rotation of said electric motor and said spindle, whereby either right hand or left hand threads may be cut under similar conditions of control as to direction of feeding movement.

2. In a boring and threading machine, a spindle carrying ram arranged for axial feeding movement, a cutter carrying spindle rotatably mounted in said ram, an electric motor operatively connected to rotate said spindle, a transmission train including reversing and rate changing mechanism connected to be driven by said spindle and operative to effect feeding movement of said ram, control mechanism for said motor including forward and reverse ram operating switches, and a control switch associated with said mechanism and operative to condition said control mechanism to provide for maintaining the directional effect of said ram operating switches regardless of the direction of rotation of said spindle, whereby threading operations to form either right hand or left hand threads may be controlled by said ram operating switches without confusion regarding the direction of ram feeding movement.

3. In a boring and threading machine, the combination with an axially movable spindle carrying ram, a cutter supporting spindle rotatably mounted in said ram, power driven means operatively connected to rotate said spindle in either direction selectively, and means driven by said spindle and operatively connected to effect axial feeding movement of said ram and spindle in either direction selectively for performing a boring operation, of control apparatus selectively operable to condition said machine for thread cutting, comprising a selectively engageable brake operative to stop said spindle rotating means quickly, trip mechanism operative to discontinue driving said spindle and to apply said brake at the end of a threading cut of predetermined length, and directional ram control mechanism arranged to control the direction of feeding movement of said ram independently of the direction of rotation of said spindle during a threading operation, whereby a threading tool on said spindle may be advanced in a threading cut to and stopped precisely at a predetermined position.

4. In a machine tool, a cutter carrying ram arranged for axial feeding movement, a cutter spindle rotatably mounted in said ram, an electric motor operatively connected to rotate said spindle and to feed said ram, means interconnecting said spindle and said ram feeding means in manner to provide for establishing a predetermined relationship between the axial and the rotary movement of said spindle for cutting threads, an electrically actuated brake associated with said motor, and electrical trip mechanism operative to de-energize said motor and engage said brake when said ram arrives at a precisely predetermined position.

5. In a machine tool transmission and control mechanism for actuating an operating machine element, an electric motor operatively connected to actuate said element, a normally open manually controlled switch electrically connected to energize said motor when closed, a holding switch operative to close in response to closing of said manually controlled switch and operative to maintain said motor energized for effecting continuous movement of said element, a limit switch operative in response to movement of said machine element to a predetermined position and functioning to stop said element by de-energizing said motor, and a selective conditioning switch operable to render said holding switch inoperative, whereby said motor may be started and stopped by said manually controlled switch to effect jogging movement of said machine element when said holding switch is inoperative.

6. In a machine tool, a base, a working element movably mounted on said base, electrically controlled driving mechanism operatively connected to effect movement of said element relative to said base, a manually operable switch arranged to effect starting of said driving mechanism, interlocking control means arranged to effect continued movement of said element regardless of whether or not said manually operable switch is opened, a limit switch arranged to stop said driving mechanism upon arrival of said element at a predetermined position, and a selectively operable switch arranged to render said interlocking control means ineffective thereby providing for direct starting and stopping of said driving mechanism by said manually operable switch.

7. In a machine tool including a base and a work element movable relative to said base, an electric motor operatively connected to effect movement of said element relative to said base, a brake associated with said motor, limit switches operatively connected to effect de-energization of said motor and engagement of said brake at each end of the course of travel of said element, control means selectively operable to render said brake inoperative, means associated with said control means and arranged to render one of said limit switches inoperative when said brake is inoperative, and means responsive to the other of said limit switches and operative upon said brake control means in manner to result in effecting engagement of said brake whenever said other limit switch is actuated.

8. In a machine tool having a spindle carrying support, a train operative to drive said support in feeding movement including a disconnecting clutch, trip mechanism arranged to disengage said clutch upon arrival of said support at a predetermined position, electrically controlled driving means connected to said support driving train, electrical trip mechanism associated with said support and operative prior to movement of said support to clutch disengaging position to stop said electrically controlled driving means, and means to render said electrical trip mechanism inoperative selectively.

9. In a machine tool, a movable working element, an electrical driving motor, a brake operatively associated with said motor, a transmission train including a disconnecting clutch disposed to transmit power from said driving motor to said working element to drive it, trip mechanism arranged to disengage said clutch upon said working element arriving at a predetermined position, electrical trip means associated with said element and operative prior to arrival of said element at clutch disengaging position to de-energize said driving motor and engage said brake, and selectively operable control means arranged to render said electrical trip means inactive, whereby movement of said element may be stopped suddenly by operation of said electrical trip means or alternatively said element may be stopped by disengaging said clutch to permit further movement of said element in effecting manual adjustment of its position.

10. In a machine tool, a base, a cutter supporting element movably mounted on said base, a cutter spindle rotatably mounted in said element, an electric motor operatively connected to drive said spindle, transmission means including reversing gearing connected to be driven from said spindle and operative to effect feeding movement of said spindle carrying element, a control system for said motor including spindle advancing and spindle retracting controlling switches, and a control conditioning switch arranged to effect reversal of the control connections between said motor and said controlling switches, whereby the directional effect of said controlling switches may be maintained when said transmission train is reversed.

11. In a machine tool, a bed presenting a tool support receiving surface and a work supporting surface, a tool carrying upright slidably mounted on said tool support receiving surface, actuating means arranged to effect movement of said upright along said surface, a worm wheel operatively connected to drive said upright moving actuating means, a worm disposed in meshing engagement with said worm wheel, an electric motor directly connected to one end of said worm, a hand wheel directly connected to the other end of said worm, limit switch mechanism operatively arranged to de-energize said motor upon the arrival of said upright at a predetermined position, precision indicating means arranged to indicate precisely the positioning of said upright by said hand wheel after said motor has been de-energized, a spindle head slidably mounted for vertical adjustment along said upright, a spindle supporting ram slidably mounted for horizontal adjustment in said head, a cutter carrying spindle rotatably mounted in said ram, an electric motor operatively connected to drive said spindle, a ram feeding train operatively connected to be driven by said spindle said feeding train including a reversing mechanism and a lead changing gear set, an electrical control system for said spindle driving electric motor including directional switches for effecting advancing or retracting movement of said ram, and a conditioning switch arranged to be set in accordance with the adjustment of said ram reversing mechanism and operative to condition said directional switches for effecting movement of said ram in the indicated direction regardless of the direction of rotation of said spindle.

12. In a machine tool, a work supporting structure, a cutter carrying spindle, supporting means arranged to rotatably support said spindle and to provide for axial feeding movement thereof, a driving motor operatively connected to rotate said spindle, driving mechanism including a disconnecting clutch and reversing gearing arranged to effect feeding movement of said spindle support by power derived from said spindle, limit stop mechanism arranged to disengage said disconnecting clutch upon said spindle being fed to a preselected position, a limit switch selectively operable by said stop mechanism to de-energize said driving motor for stopping said feeding movement without disengaging said clutch, control switches arranged to effect operation of said driving motor in the one or the other direction selectively, and a conditioning switch adjustable in accordance with the adjustment of said reversing gearing and operative to condition said directional control switches to effect consistent feeding movements of said spindle supporting means regardless of the direction of rotation of said spindle.

13. In a boring and threading machine, the combination with an axially movable and rotatably mounted cutter supporting spindle, power driven means operatively connected to rotate said spindle in either direction selectively, and means driven by said spindle and operatively connected to effect axial feeding movement of said spindle in either direction selectively for performing a boring operation, of control apparatus selectively operable to condition said machine for thread cutting, said control apparatus comprising a selectively engageable brake operative to stop said spindle rotating means quickly, trip mechanism operative to discontinue driving said spindle and to apply said brake at the end of a threading cut of predetermined length, and directional control mechanism arranged to control the direction of feeding movement of said spindle independently of the direction of rotation of said spindle during a threading operation, whereby a threading tool on said spindle may be advanced in a threading cut to and stopped precisely at a predetermined position.

14. In a machine tool, a cutter carrying spindle rotatably mounted and arranged for axial feeding movement, an electric motor, means operatively connecting said motor to rotate said spindle and to effect axial feeding movement thereof, means interconnecting said spindle rotating means and said spindle feeding means in manner to provide for establishing a predetermined relationship between the axial and the rotary movement of said spindle for cutting threads, an electrically actuated brake associated with said motor, and electrical trip mechanism operative to de-energize said motor and engage said brake when said spindle arrives at a precisely predetermined position at the end of a thread cutting operation.

15. In a machine tool including a base and a work element movable through a course of travel relative to said base, an electric motor operatively connected to effect movement of said element relative to said base, a brake associated with said motor, limit switches operatively connected to effect de-energization of said motor and engagement of said brake at each end of the course of travel of said element respectively, control means selectively operable to render said brake inoperative, means associated with said control means and arranged to render one of said limit switches inoperative when said brake is rendered inoperative, and actuating means for said brake control means responsive to the other of said limit switches and operative when said limit switch is actuated to actuate said brake control means in manner to render said brake operative for engagement by action of said limit switch.

16. In a machine tool, a movable operating member, an electric motor for driving said member, a transmission mechanism including a disconnecting device operatively connecting said motor to said operating member to move it, a power circuit including a switch connected to energize said motor, trip mechanism associated with said movable operating member arranged to open said switch when said member approaches to within a predetermined distance from a selected stopping point to stop said motor without disengaging said disconnecting device, a control switch selectively operable to render said trip switch ineffective, and trip mechanism arranged to disengage said disconnecting device when said trip switch is ineffective and said member approaches to within a distance less than said predetermined distance from the selected stopping point.

17. In a machine tool, a base, a cutter supporting spindle rotatably and movably mounted on said base for rotary cutting and bodily feeding movements, an electric motor operatively connected to rotate said spindle, a transmission train including reversing mechanism connected to be driven from said spindle and operative to effect feeding movement of said spindle, a control system for said motor including spindle advancing and spindle retracting control switches, and a control conditioning switch arranged to effect reversal of the control connections between said motor and said control switches, whereby the directional effect of said control switches may be maintained when the feeding effect of said transmission train is reversed.

JOSEPH B. ARMITAGE.
ORRIN W. BARKER.
KURT A. RIEDEL.
FRANCIS D. BOEHMER.